US006389333B1

(12) United States Patent
Hansman et al.

(10) Patent No.: US 6,389,333 B1
(45) Date of Patent: May 14, 2002

(54) INTEGRATED FLIGHT INFORMATION AND CONTROL SYSTEM

(75) Inventors: R. John Hansman; Richard P. Kornfeld, both of Cambridge; John J. Deyst, Arlington, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/462,312

(22) PCT Filed: Jul. 8, 1998

(86) PCT No.: PCT/US98/14276

§ 371 Date: May 10, 2000

§ 102(e) Date: May 10, 2000

(87) PCT Pub. No.: WO99/03000

PCT Pub. Date: Jan. 21, 1999

Related U.S. Application Data

(63) Continuation-in-part of application No. 08/890,268, filed on Jul. 9, 1997, now abandoned.

(51) Int. Cl.[7] .............................. G06F 7/00; G05D 1/00
(52) U.S. Cl. ................................ 701/3; 701/14; 701/4; 701/200
(58) Field of Search .............................. 701/3, 4, 5, 6, 701/14, 120, 200, 207; 244/3.2, 177, 3.16; 340/975; 73/178 R

(56) References Cited

U.S. PATENT DOCUMENTS

| 4,006,870 A | * | 2/1977 | Boone et al. ................ 244/184 |
| 4,244,215 A | * | 1/1981 | Merhav ..................... 73/178 R |
| 4,405,986 A | | 9/1983 | Gray .......................... 364/434 |

(List continued on next page.)

FOREIGN PATENT DOCUMENTS

WO    WO96/08730    3/1996

OTHER PUBLICATIONS

Welch, Greg et al., An Introduction to the Kalman Filter, pp. 1–16.
Arndt, Christopher, Data–Fusion with Kalman–Filters/Optimal Extraction of Information, 1996, pp. 1–5.
Brown, Ronald A., Instantaneous GPS Attitude Determination, 1992, pp. 113–120.
Fujikawa, Stephen et al., Spacecraft Attitude Determination by Kalman Filtering of Global Positioning System Signals, 1995, pp. 1365–1371.

*Primary Examiner*—Jacques H. Louis-Jacques
(74) *Attorney, Agent, or Firm*—Cesari and McKenna, LLP; Martin J. O'Donnell, Esq.

(57) ABSTRACT

An improved navigation and display system especially suitable for small aircraft rapidly determines the attitude (roll and pitch) of an aircraft from measurements made by an inexpensive, single receiver and antenna responsive to signals obtained from a satellite positioning system, e.g., the Global Positioning System. In contrast to conventional attitude navigation systems, which determine and display conventional (body-axis referenced) pitch angle, the present system determines and displays the "pseudo-attitude" or stability axis roll and pitch (flight path) angle, so that the pilot has an instantaneous comprehension of the actual flight path angle of the aircraft without needing to correct for angle of attack as in conventional attitude information systems. A Kalman filter with a short (~0.5 second) time constant provides data at a sufficient rate (e.g., ~10 Hz) to enable real-time flight with the system. With the additional availability of measured or estimated angle of attack, this system can also display conventional roll and pitch attitude angles. The pseudo-attitude data is incorporated into an integrated flight information system which derives all its data from the single GPS sensor and which presents all the information needed for navigation and control of the aircraft in which it is mounted.

40 Claims, 7 Drawing Sheets

U.S. PATENT DOCUMENTS

| | | | | |
|---|---|---|---|---|
| 5,021,792 | A | 6/1991 | Hwang | 342/357 |
| 5,101,356 | A | 3/1992 | Timothy et al. | 364/449 |
| 5,144,318 | A | 9/1992 | Kishi | 342/357 |
| 5,185,610 | A | 2/1993 | Ward et al. | 342/357 |
| 5,296,861 | A | 3/1994 | Knight | 342/357 |
| 5,311,194 | A | 5/1994 | Brown | 342/357 |
| 5,357,263 | A * | 10/1994 | Fischer et al. | 345/9 |
| 5,402,347 | A | 3/1995 | McBurney et al. | 364/443 |
| 5,406,489 | A | 4/1995 | Timothy et al. | 364/434 |
| 5,416,712 | A | 5/1995 | Geier et al. | 364/450 |
| 5,438,337 | A | 8/1995 | Aguado | 342/357 |
| 5,451,963 | A | 9/1995 | Lempicke | 342/357 |
| 5,451,964 | A | 9/1995 | Babu | 342/357 |
| 5,471,509 | A | 11/1995 | Wood et al. | 375/350 |
| 5,506,588 | A | 4/1996 | Diefes et al. | 342/357 |
| 5,523,761 | A | 6/1996 | Gildea | 342/357 |
| 5,534,875 | A | 7/1996 | Diefes et al. | 342/357 |
| 5,548,293 | A | 8/1996 | Cohen | 342/357 |
| 5,594,453 | A | 1/1997 | Rodal et al. | 342/357 |
| 5,708,583 | A | 1/1998 | Solenne et al. | 364/424.013 |
| 5,948,045 | A * | 9/1999 | Reiner | 701/220 |

* cited by examiner

INTEGRATED FLIGHT INFORMATION AND CONTROL SYSTEM

CROSS REFERENCE TO RELATED APPLICATION

This application is a continuation in part of U.S. patent application Ser. No. 08/890,268, filed Jul. 9, 1997, now abandoned and entitled "Aircraft Attitude Indicator".

BACKGROUND OF THE INVENTION

A. Field of the Invention

The invention relates to aircraft instrumentation and control and, more particularly, comprises a method and apparatus for improved attitude determination and navigation, and an improved integrated flight information and control system in connection therewith.

B. Prior Art

Safe control and navigation of an aircraft requires a continuous stream of relatively accurate information concerning the dynamics of the aircraft as it moves along its flight path from origin to destination. Information such as the airplane's altitude, velocity, heading, attitude (including at least pitch and roll information), among other data, are important for piloting the aircraft. Extensive, highly accurate, and correspondingly expensive, instrumentation has been developed for commercial and military aircraft to fill the required need. Such instrumentation is far too expensive for smaller, private aircraft, and the latter therefore must make do with simpler, cruder navigation systems providing more limited, and commonly less accurate, navigation data.

In larger commercial and military aircraft, inertial navigation systems have commonly been the instrumentation of choice. Such systems rely on the ability of gyroscopes to maintain their orientation in space once initialized, and to provide relatively sensitive indications of accelerations tending to disturb that orientation. These systems typically have significant mass and bulk, are expensive to acquire, and require continued, frequently costly, calibration, maintenance and repair to ensure continued acceptable performance. Their use has therefore been confined largely to larger commercial and military aircraft.

The advent of satellite positioning systems, such as the Global Positioning System (GPS) established and maintained by the United States, or the GLONASS system established and maintained by Russia, offers the possibility of significantly reducing the mass and bulk of many present navigation systems, and possibly their cost as well. Navigation systems using these facilities rely on the measurement of phase differences in received radio signals from a number of satellites in order to determine the position in space of the receiver, and therefore the platform on which the receiver is carried, with respect to the satellites. Because the position and velocity of the satellites relative to earth at any given time is known, the position and velocity of the receiver with respect to an arbitrary earth-based reference system can be determined from measurements with respect to the satellites.

In addition to navigation functions, such systems can also be used to determine the attitude of the vehicle in which the system is mounted. Numerous attitude determination systems based on GPS measurements have been proposed and such systems take many forms. For example, U.S. Pat. No. 5,548,293 issued Aug. 20, 1996 to Clark E. Cohen and entitled "System and Method for Generating Attitude Determinations Using GPS" proposes the use of a multiplicity of antennas on a vehicle whose orientation with respect to a reference frame is to be determined. The antennas provide a multiplicity of baselines from which the orientation may be found. Multiple baselines are used in order to resolve the position ambiguity inherent in measurements from antennas typically separated by many meters resulting from the short wavelengths used in GPS signaling (on the order of 0.2 meters). The use of a number of antennas, of course, increases the cost of the system, as well as the cost of installation, and inhibits the application of such a system to small aircraft in particular. Further, because of the very short wavelength, significant errors are introduced in the measurement whenever the distance between the antennas changes, as it is susceptible to do in response to stresses imposed on the aircraft during flight.

Some systems, such as that described in U.S. Pat. No. 5,534,875 issued Jul. 9, 1996 to Debra Diefes et al., entitled "Attitude Determining System for Use with Global Positioning System", utilize a single GPS receiver and antenna on board the vehicle, but use standard inclinometers to determine the pitch and roll of the vehicle platform. Such hybrid systems fail to make use of the capabilities of GPS for attitude determination.

Still other systems, such as that described in U.S. Pat. No. 5,451,963, issued Sep. 19, 1995 to Thomas A. Lempicke, entitled "Method and Apparatus for Determining Aircraft Bank Angle Based on Satellite Navigational Signals", utilize a single on-board GPS system that determines certain attitude information, such as bank angle, only under conditions of level flight, thus precluding effective use of the system in arbitrary maneuvers such as climbing or descending turns in which accurate attitude information is often most essential, particularly in connection with takeoff and landing. Further, the system posits a mode of operation (determining bank angle as inversely proportional to aircraft speed) which is not explained and not achievable by anything described in the patent.

Still another GPS-based system is described in U.S. Pat. No. 5,406,489, issued Apr. 11, 1995 to LaMar K. Timothy et al., entitled "Instrument for Measuring an Aircraft's Roll, Pitch and Heading by Matching Position Changes Along Two Sets of Axes". This patent uses both a GPS receiver and a multiplicity of accelerometers oriented along the three aircraft body axes, respectively, to determine attitude and other navigation information. Again, the hybrid nature of the system increases its cost, complexity, and maintenance requirements.

SUMMARY OF THE INVENTION

A. Objects of the Invention

Accordingly, it is an object of the present invention to provide an inexpensive but relatively accurate and reliable attitude determination method and apparatus for aircraft navigation.

Another object of the invention is to provide a simple, low-cost navigation system for determining attitude (roll, pitch) information for small aircraft.

Further, it is an object of the invention to provide an inexpensive attitude determination system that is useful as a backup for more elaborate navigation instrumentation systems.

Still a further object of the invention is to provide a simple, relatively inexpensive attitude indicator.

Yet another object of the invention is to provide an improved, economical integrated flight information and control system for control and navigation of aircraft.

B. Brief Summary of the Invention

In accordance with the present invention, we provide a method and apparatus for readily and inexpensively determining and displaying flight path angle and roll angle of an aircraft despite its engagement in arbitrary, but balanced, maneuvers such as ascent or descent accompanied by banked turns, conditions which present problems for many navigation systems. Because of its simplicity, and its reliance on a single source of measurement data for the requisite input information, the system is extremely simple and inexpensive to construct, install, and maintain. It is particularly suited for installation and use in small aircraft, where the cost of more elaborate and more expensive systems considered essential for navigation on larger aircraft effectively preclude their acquisition and use. Further, the system is sufficiently accurate and reliable to be used as a supplemental system on larger aircraft for use in integrity checking, as well as for backup in the event of failure of the primary system. The present invention obviates the use of a multiplicity of receivers or antennas or supplemental orientation indicators, and is useful throughout the entire range of flight dynamics commonly encountered in air navigation.

In particular, in accordance with the preferred embodiment of the invention, we determine the flight path angle $\gamma$ and roll angle $\phi_s$ of an aircraft and display these as parameters to the pilot as a principal measure of the aircraft attitude at a given moment. For convenience of reference, the stability axis roll angle $\phi_s$ and flight path angle $\gamma$ will on occasion be referred to hereinafter as the "pseudo-attitude" parameters or, more simply, as "the pseudo-attitude", in contrast to the conventional attitude parameters based on a body axis, namely, roll $\phi$ and pitch $\theta$. The roll angle $\phi_s$ ("pseudo roll") is advantageously determined with respect to the stability axis of the aircraft, as opposed to the body axis, since determination of the stability axis roll angle requires no knowledge of the angle of attack, a parameter which is frequently not known or readily determinable with accuracy in small aircraft. Similarly, the flight path angle $\gamma$ or "pseudo pitch" is determined about the stability axis of the aircraft in order to present a direct indication of the path of the vehicle through space. This is in contrast to conventional attitude navigation systems which determine and display roll angle and pitch about the aircraft's body axis. Although the body-axis and stability-axis roll angle are typically nearly equal to each other, this is not the case with pitch angle, which differs from flight path angle by the angle of attack. Thus, in conventional systems, when a pilot wishes to maintain the aircraft on a particular flight path angle, he/she can not navigate by the pitch angle alone, but must correct it by the current angle of attack, a value which is frequently known only imprecisely at best in small aircraft, and which can change from moment to moment, dependent on the flying situation. With the aid of the present invention, the pilot is presented directly with the flight path angle and can thus navigate and control the aircraft more readily.

Further in accordance with the present invention, we have developed a simple and reliable method and apparatus for determining the desired fight path and roll angles under arbitrary conditions as long as the flight dynamics are balanced, i.e., the forces required for any centripetal acceleration associated with a maneuver are balanced by the lift and gravitational forces associated with that maneuver, as described more fully below. Specifically, from the data obtained from a measurement system such as a GPS system which provides at least periodic measurements of the position of the aircraft, we obtain velocity and acceleration data from which the desired attitude (flight path angle, roll) information is determined. In accordance with the preferred embodiment, a Kalman filter receives the measurement data and provides the required information from which the desired attitude is determined. In our filter, the aircraft is modeled as a triple integrator system, the filter then providing estimates of the jerk (impulse), velocity, and acceleration of the aircraft during its maneuvers. The latter (velocity and acceleration) estimates provide the requisite information for determination of the desired attitude as described more fully below.

In particular, in accordance with the preferred embodiment of the invention, we determine the flight path angle $\gamma$ and roll angle $\phi_s$ of an aircraft and display these as parameters to the pilot as a principal measure of the aircraft attitude at a given moment. The roll angle is advantageously determined about the stability axis of the aircraft, as opposed to the body axis, since determination of the stability axis roll angle requires no knowledge of the angle of attack, a parameter which is frequently not known or readily determinable with accuracy in small aircraft. This is in contrast to conventional aircraft navigation systems which determine and display roll angle and pitch about the aircraft's body axis. Although the body-axis and stability-axis roll angle are typically nearly equal to each other, this is not the case with pitch angle, which differs from flight path angle by the angle of attack. Thus, when a pilot wishes to maintain the aircraft on a particular flight path angle, he/she can not navigate by the pitch angle alone, but must correct it by the current angle of attack, a value which is frequently known only imprecisely at best in small aircraft, and which can change from moment to moment dependent on the flying situation.

The present invention enables construction of an integrated flight information and control system that presents to the pilot all the information necessary to safely pilot an aircraft but which eliminates costly equipment such as attitude and heading reference systems (AHRS) and other sensors heretofore required to generate the necessary data. In particular, all the essential parameters commonly measured for use in controlling and navigating the aircraft can now be obtained from a single sensor, i.e., a single GPS receiver that provides the requisite outputs from which the position, altitude, vertical speed, ground speed, ground heading, and now, pseudo attitude, of the aircraft can be determined. Thus, an integrated flight information and control system of the type commonly found only in large, commercial aircraft such as a Boeing 747 can now feasibly be provided in small aircraft such as a Piper Arrow. The result is expected to revolutionize aircraft flight information and control systems on such aircraft.

In addition to utilization in small aircraft, the attitude indicator and flight and control system of the present invention is adapted to larger, commercial and military aircraft as well, where it may serve either as the principal navigation and control system or as a backup system or a reference system for integrity checking. Because of the dramatically reduced cost of the system, a significantly greater degree of redundancy may be provided at a reasonable cost, thus further enhancing flight safety overall.

BRIEF DESCRIPTION OF THE DRAWINGS

The foregoing and other and further objects and features of the invention will be more readily apparent in consideration of the following detailed description of the invention, when taken in conjunction with the accompanying drawings in which.

DETAILED DESCRIPTION OF THE INVENTION

Figure 1:
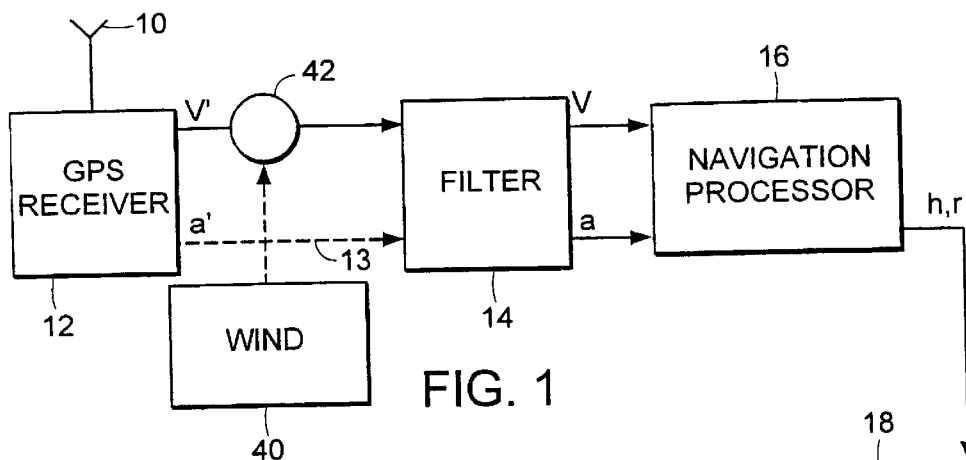
FIG. 1 is a block diagram of a navigation system in accordance with the present invention.
Figure 2:
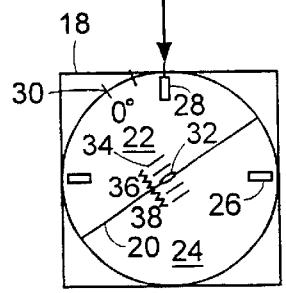
FIG. 2 is a sketch of an aircraft showing the orientation of the body, stability and wind axes with respect to the aircraft in relation to a local, ground-fixed reference frame.
Figure 2:
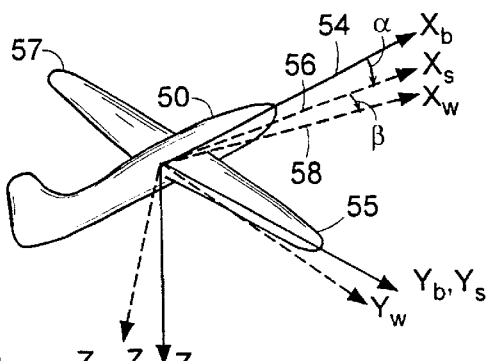

Turning, now, specifically to FIG. 1, an antenna 10 provides GPS signals to a receiver 12 for determination of the instantaneous position of the receiver with respect to a multiplicity of GPS satellite transmitters (not shown) and thus, since the position of the satellites themselves is known, with respect to a ground-based reference frame shown in FIG. 2 as N, E, D (for "north", "east" and "down", respectively). In implementation of the present invention, we have used a NovAtel 3151 R receiver board which provides as output not only the instantaneous position in the ground-based frame, but also the velocity components $V'_N$, $V'_E$, and $V'_D$ of the receiver in that frame. Preferably, the receiver 12 provides its outputs at a sufficiently fast rate that the path of the receiver (and thus, of the aircraft to which it is attached) through space can be very closely tracked. In our implementation, the receiver is configured to provide data at a rate of 10 sets of data per second.

The output of the receiver 12 is applied to a filter 14. Preferably, this filter is of the Kalman type, a filter that is widely used in control systems for smoothing data measurements and for providing further data based on the input data. In the present case, the filter is configured to provide an estimate of the receiver (and thus aircraft) velocity as it moves along the flight path and, additionally, to provide an estimate of the acceleration of the aircraft along the flight path. Of course, where the receiver itself provides the desired acceleration data, as some do, the receiver acceleration data is also provided to the filter 14 (as indicated by the dotted line 13 in FIG. 1) which then need only filter it.

A navigation processor 16 receives the velocity and acceleration outputs from the filter 14 and, based on this data and on the flight dynamics of the aircraft, determines the roll and pitch of the aircraft in the manner described more fully below. In accordance with the present invention, the (stability axis) roll angle $\phi_s$ and flight path angle $\gamma$ are presented to a display 18 for utilization in navigation.

The conventional roll angle $\phi$ and pitch angle $\theta$ commonly used in attitude display and navigation are referred to the body axis of the aircraft as will be described more fully below in connection with FIG. 2, while the stability roll angle $\phi_s$ and pitch angle (flight path angle $\gamma$) are referred to the stability axes of the aircraft. The stability axes define the path of the center of gravity of the aircraft as it moves along its flight path. The stability pitch angle (flight path angle) is an important parameter, not commonly provided to the pilot, for use in navigation; it provides a more direct indication of the rate of descent or ascent of the aircraft at a given time than the conventional pitch angle $\theta$ and is not dependent on the angle of attack.

As is the case with conventional attitude indicators, the display 18 has a horizon line 20 separating the sky 22 from the ground 24. An aircraft, stylistically indicated by wings 26 and tail 28, indicates the stability roll angle $\phi_s$ by means of the angular displacement of the tail marker 28 with respect to a roll angle scale 30. In FIG. 1, the aircraft is illustrated as banked to the right by 20 degrees. The flight path angle $\gamma$ is indicated by a marker 32 with respect to a scale 34. As illustrated, the marker 32 is positioned on the horizon line, and thus the aircraft as shown in FIG. 1 is neither climbing nor descending but is instead engaged in level flight. When the aircraft climbs, the marker 32 will move to the upper area 36 of the scale 34, thus clearly indicating a climb and its magnitude. Conversely, when the aircraft descends, the marker will move to the lower area 38 of scale 34, thus indicating the descent and its magnitude. Thus, flight path angle and roll angle are directly presented to the pilot, without need for approximation or estimation of the flight path angle by the pilot.

The presence of a wind (referred herein as a "ground wind" to distinguish it from the apparent wind seen by the aircraft as it moves along its flight path) will typically not have a significant effect on measurements discussed herein, provided that it is of no more than moderate strength, i.e., less than about 20% of the aircraft speed. However, where it is desired to obtain enhanced accuracy, particularly in high wind conditions, a wind indicator 40 may be used to correct the measured velocity V' prior to the application of the latter data to the filter 14. In particular, the N, E and D components of the wind as measured by the indicator 40 are subtracted, in a summing junction 42, with the corresponding components of the measured velocity V', and the resultant velocity is then applied to the filter 14.

Turning now to FIG. 2, an aircraft 50 is shown in motion relative to a ground-based N, B, D reference frame 52. A body axis system 54 ($x_b$, $y_b$, $z_b$) is defined with respect to the airplane as follows: The $x_b$ axis points longitudinally along the fuselage of the aircraft towards its nose; the $y_b$ axis is orthogonal to the $x_b$ axis and points along the right wing 55 of the aircraft; and the $z_b$ axis is orthogonal to the other two axes and points downwardly with respect to them.

A "stability" axis system 56 ($x_s$, $y_s$, $z_s$) is defined with respect to the motion of the center of gravity of the aircraft as it moves along its fight path. The $y_s$ axis is coincident with the $y_b$ axis; the $x_s$ and $z_s$ axes are rotated about the $y_b$ axis with respect to the $x_b$ and $z_b$ axes, respectively, by the angle of attack $\alpha$. Finally, a wind axis system 58 ($x_w$, $y_w$, $z_w$) is defined with respect to the apparent wind (i.e., the apparent direction of the air seen by the aircraft as it moves along its flight path), with $z_w$ coincident with $z_s$ and $x_w$ and $y_w$ rotated about $z_w$, $z_s$ by the angle $\beta$ with respect to the $x_s$ and $y_s$ axes, respectively.

The conventional pitch $\theta$ and roll $\phi$ angles are defined by the relation of the body x and y axes ($x_b$, $y_b$) respectively with respect to a plane parallel to the local horizontal ground reference plane established by the N and E axes, respectively. The conventional roll angle is defined by the relation of the $y_b$ axis to the local horizontal ground reference plane as measured about the $x_b$ axis. Similarly, the stability axis roll angle $\phi_s$ is defined by the relation between the $y_s$ axis and the local horizontal ground reference plane as measured about the $x_s$ axis, and the flight path angle γ is defined by the angle between the $x_s$ axis and its projection onto that horizontal ground reference plane.

Figure 3:
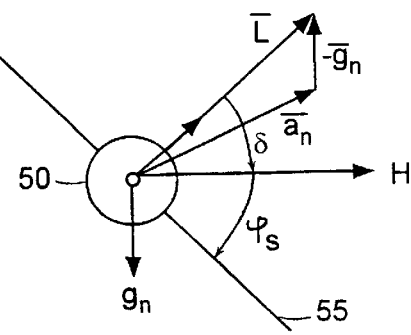
FIG. 3 is a stylized sketch of an aircraft, as seen from the rear, during an arbitrary balanced maneuver and showing the orientation of the forces and accelerations established by the dynamics of the aircraft.

In light of FIG. 2, the determination of the pitch and roll angles in accordance with the present invention may now be more readily understood. For the moment, it will be assumed that the aircraft is flown along its flight path with negligible side slip, that is, β is zero and the wind axis systems and stability axis systems coincide. Further, in order to simplify the discussion, it will be assumed in the following description that the wind is zero, although the presence of wind in practice is accounted for by modifying the velocity components as measured by the GPS system. FIG. 3 then shows the relevant dynamics (forces and accelerations) of the aircraft as it undergoes an arbitrary but balanced flight path maneuver, in this instance a balanced turn (i.e., the lift is perpendicular to the wings and the components of the lift, centripetal acceleration, and gravity normal to the flight path balance each other) in which the aircraft may be climbing, stationary, or descending with respect to the ground reference plane.

FIG. 3 shows the aircraft as seen from the rear, with its right wing 55 pointing downwardly with respect to a horizontal reference vector H by an amount $\phi_s$. The gravitational acceleration g is divided into two components, the first, $g_n$, being taken normal to the flight path followed by the plane, and a tangential component $g_t$ being taken along this flight path. It will be understood that if the aircraft is following any path other than a level path, the normal component $g_n$ will not coincide with the local gravitational acceleration.

The normal and tangential components of the gravitational acceleration vector g are related by:

$$g = g_n + g_t \quad (1)$$

where the components in this and the following equations are vector quantities. The tangential component is given by:

$$g_t = \frac{g \cdot V}{|V| \cdot |V|} V, \quad (2)$$

where V (Vx,Vy,Vz) is the velocity vector of the aircraft along its flight path, where the dot indicates a dot product and the bars "||" indicate the magnitude of the corresponding vectors.

Thus, $g_n$ is given by:

$$g_n = g - g_t = g - \frac{g \cdot V}{|V| \cdot |V|} V \quad (3)$$

The gravitational acceleration g is a known constant obtainable for the various positions on earth, and acts vertically downward along the ground axis D. The velocity V is the aircraft velocity as provided to the navigation processor by the Kalman filter 14. Thus, the normal gravitational acceleration, $g_n$, is determinable from the information provided.

For a balanced turn, the acceleration, L, is perpendicular to the wings 55, 57 as shown in FIG. 3. The acceleration of the aircraft has two components, namely, a normal (centripetal) component $a_n$ perpendicular to the flight path and a tangential component $a_t$ along the flight path, i.e.:

$$a = a_n + a_t \quad (4)$$

The acceleration a is provided as an output of the Kalman filter 14 based on inputs from the GPS receiver 12. The tangential component $a_t$ of the aircraft acceleration a, is given by:

$$a_t = \frac{a \cdot V}{|V| \cdot |V|} V \quad (5)$$

and is thus completely determined from the estimated acceleration and velocity as provided by the filter 14. Accordingly, the normal component $a_n$ is determined by the processor 16 as:

$$a_n = a - \frac{a \cdot V}{|V| \cdot |V|} V \quad (6)$$

A local horizontal reference, H, is determined as:

$$H = g_n \times V, \quad (7)$$

where the "x" indicates the vector product of the vectors $g_n$ and V. Because the forces are balanced, the following relationships holds:

$$L = a_n - g_n \quad (8)$$

Since $a_n$ is determined as set forth in equation 6, and $g_n$ is determined as set forth in equation 3, L is therefore completely determined. From this, the angle between the acceleration vector L and the reference vector H may be determined from the dot product, namely:

$$\delta = \cos^{-1}\left\{\frac{L \cdot H}{|L||H|}\right\} \quad (9)$$

Finally, the (stability) roll angle $\phi_s$ may be determined as:

$$\phi_s = \pi/2 - \delta \quad (10)$$

and the flight path angle y then obtained as:

$$\gamma = \tan^{-1}\left\{\frac{-V_z}{(V_x^2 + V_y^2)^{\frac{1}{2}}}\right\} \quad (11)$$

where the minus sign is used to provide a positive value for the flight path angle for an upward (negative) velocity in accordance with convention. A navigation processor performing the calculations of equations 1–11 has been implemented on an IBM laptop personal computer. As may be seen from the preceding equations, the required computations are not complex and are readily and quickly performed.

In order to test the capabilities of the system, it was installed in a Piper Arrow IV aircraft flown on a path between Hanscom Air Force Base in Bedford, Mass. and Plymouth, Mass. Various maneuvers were executed on this flight path, including straight and level flight, climbing flight, and a variety of banked turns, including descending turns of the kind one might make in preparing for landing, as well as level turns. The performance of the instrument was compared with data provided in a MIGITS (Miniature Integrated GPS/INS System) system, and the results are shown in FIGS. 4–6.

Figure 4:
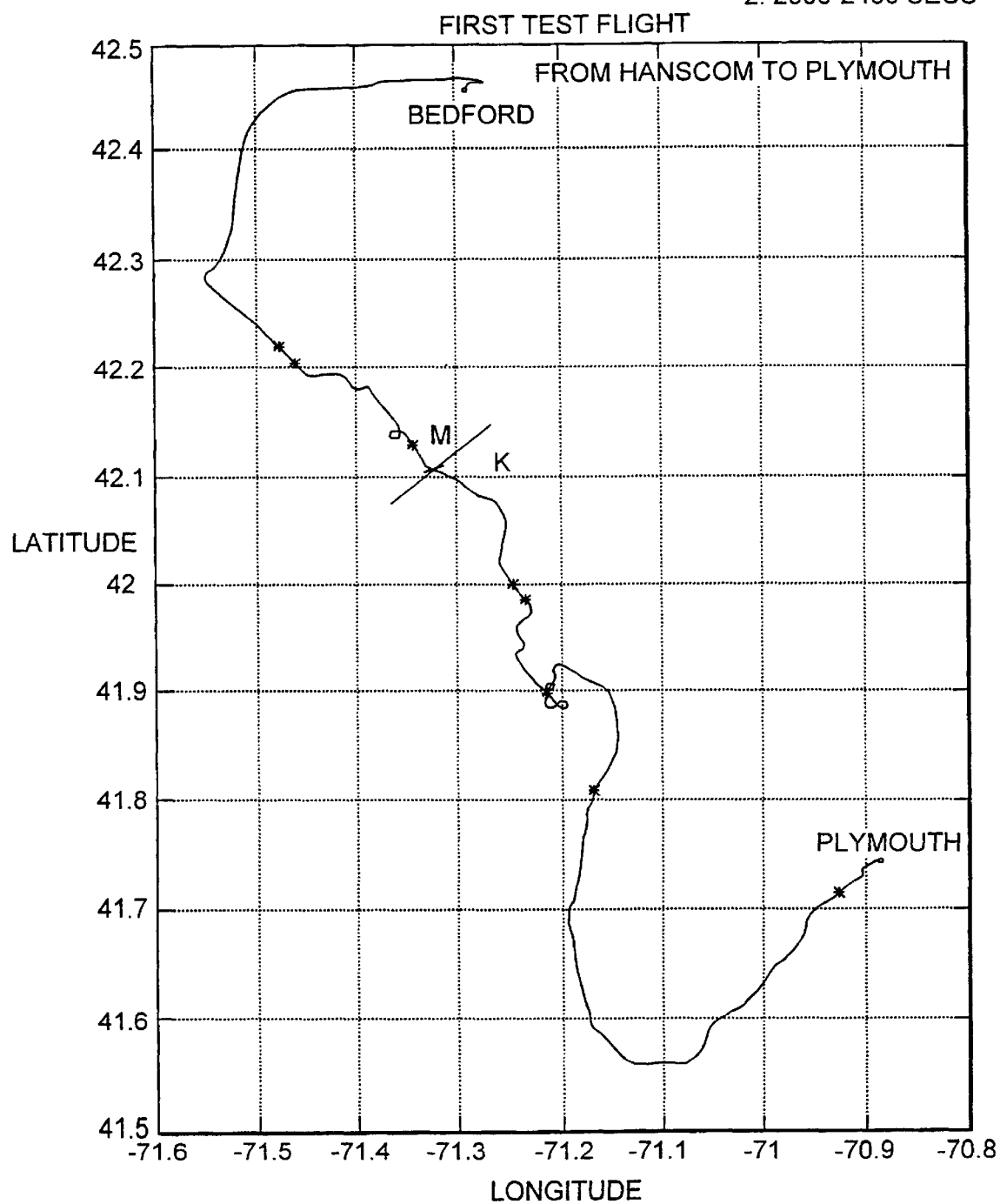
FIG. 4 is a chart showing the track of an aircraft carrying the navigation system of the present invention and illustrating various maneuvers performed to test the system of the present invention.

FIG. 4 shows the flight path, which extended from approximately 42.5° to 41.5° north latitude, and 71.6° to 70.9° west longitude. As may be seen from FIG. 4, a variety of flight conditions were tested, including straight, gently turning, and strongly turning flight segments.

Figure 5:
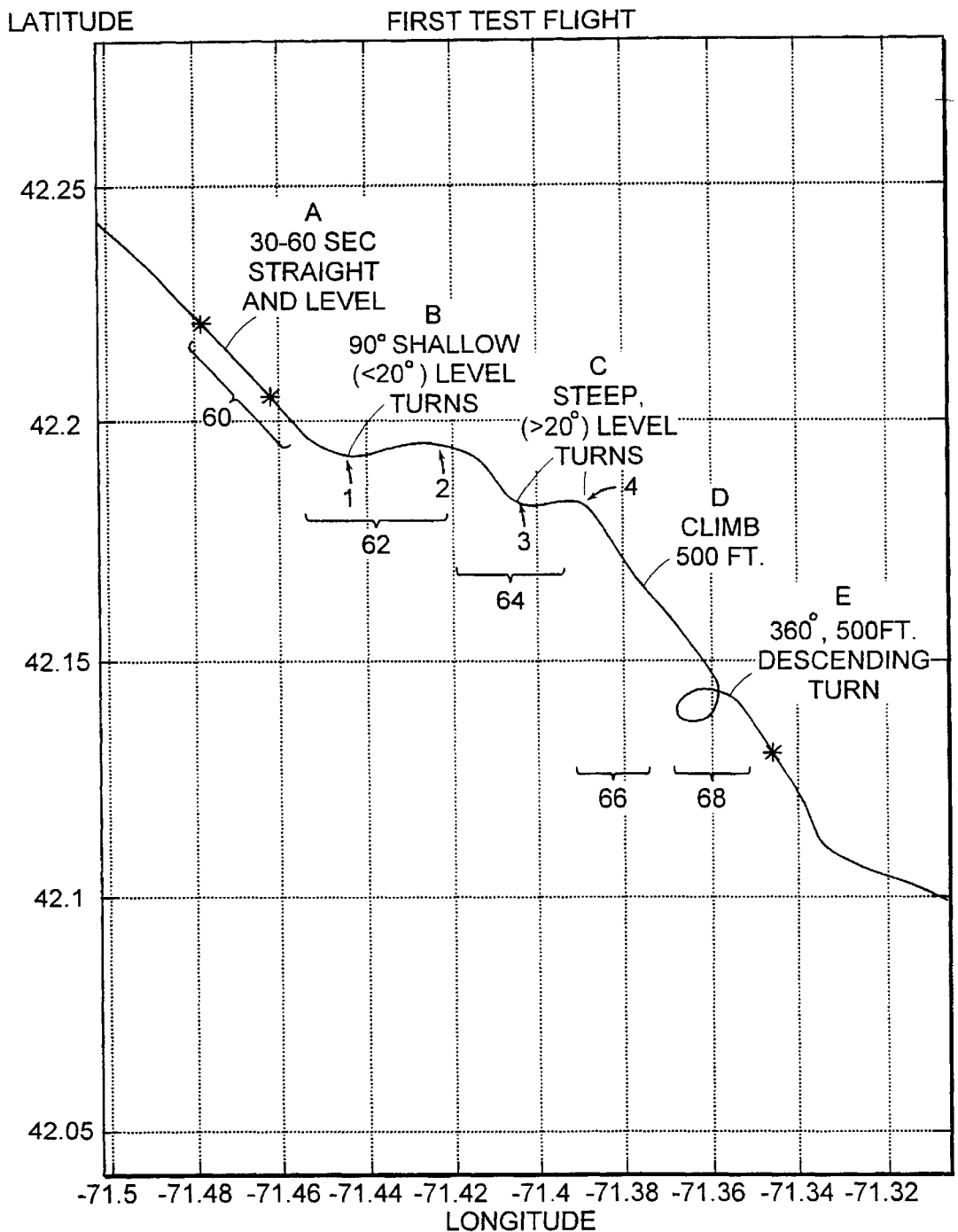
FIG. 5 is an enlarged view of sections of the track of FIG. 4.
Figure 6:
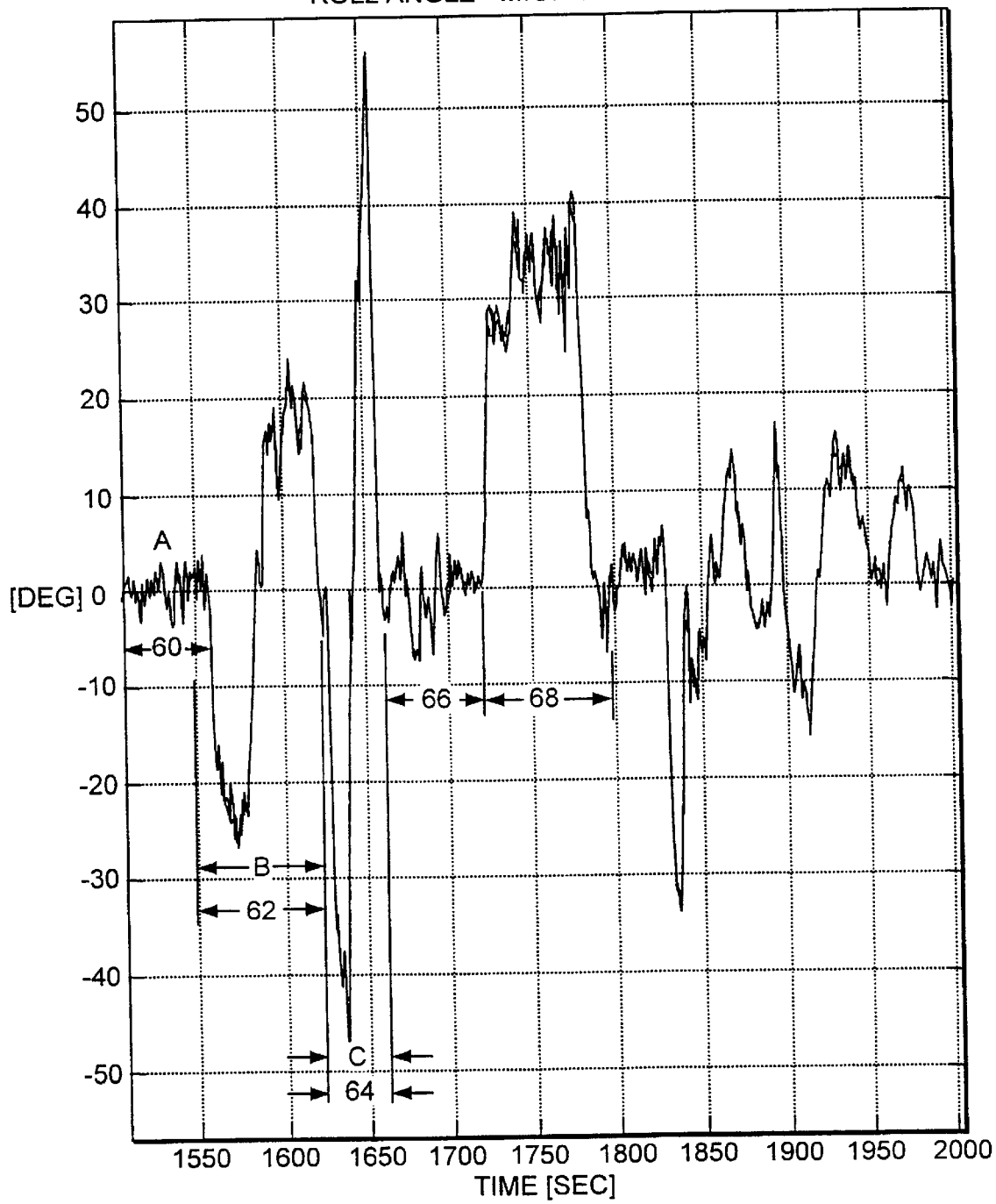
FIG. 6 is a plot of the roll angle as determined by the system of the present invention, superimposed on a plot of the roll angle as measured by a standard MIGITS ("Miniature Integrated GPS/INS System") system for the flight path of FIG. 4.

FIG. 5 is an enlarged view of a portion of FIG. 4, showing the portion of the flight path extending from approximately 71.3° to 71.5° west longitude. In a first portion of the flight generally indicated by numeral 60, the plane was flown in an approximately level condition. FIG. 6 shows the roll angle as measured by the MIGITS system and as determined in accordance with the present invention. As there shown, the two determinations are practically identical, that is, so closely they track each other that one cannot reasonably distinguish between the two of them.

Comparing FIGS. 5 and 6 again, a shallow level turn indicated by numeral 62 was followed by a steep level turn 64. Again, the system of the present invention tracked the reference MIGITS system nearly identically.

The next maneuver comprised a 500 foot climb 66, followed by a 500 foot descending turn 68. Again, the system of the present invention tracked the reference MIGITS system almost identically.

The accuracy and response rate of the system were proven to be sufficiently great as to enable the second portion of the flight (i.e., extending from approximately 71.3 to 70.9 degrees west longitude) to be flown solely with the system of the present invention for the required attitude determination, including an instrument landing system (ILS) landing approach involving descending, banked turns. The system performed exceptionally well, and clearly demonstrated its usefulness as a principal attitude determination and display system.

Figure 7:
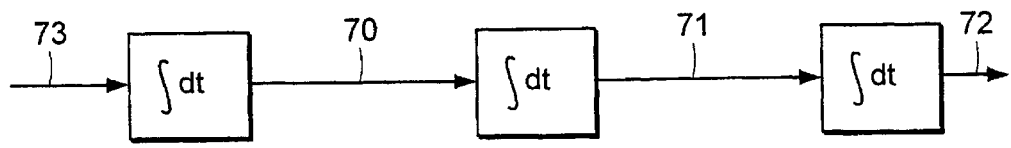
FIG. 7 is a schematic of the plant model of the motion of the aircraft.

As noted previously, the filter 14 is preferably a Kalman filter. In accordance with the present invention, the filter consists of three separate and independent filters, one each to estimate motion in the local north, east and downward directions. For each such direction we define a triple integrator model for the process (plant). In particular, referring to FIG. 7, first, second and third integrator outputs 70, 71 and 72 respectively represent jerk (j), acceleration (a) and velocity (v). In addition, there is an input 73 to the first integrator which is a white noise process. The standard form of the process model is the vector matrix equation $$\dot{x} = Ax + Bu$$

where the dot indicates the first derivative; x is the state vector $$x = \begin{bmatrix} V \\ a \\ j \end{bmatrix}$$

u is white noise; A is the 3×3 matrix $$A = \begin{bmatrix} 0 & 1 & 0 \\ 0 & 0 & 1 \\ 0 & 0 & 0 \end{bmatrix}$$

and B is the column matrix:

$$B = \begin{bmatrix} 0 \\ 0 \\ 1 \end{bmatrix}$$

In order to run the Kalman filter on a computer, the continuous time model, described above, is converted to a discrete time model of the form:

$$X_{K+1} = \phi_K X_K + W_K$$

where $X_K$ is the value of the state of vector at time $t_K$; $X_{K+1}$ is the updated value, i.e., its value at $t_{K+1}$; $\phi_K$ is the state transition matrix given by $$\phi_K = \begin{bmatrix} 1 & \Delta t & \Delta t \frac{2}{2} \\ 0 & 1 & \Delta t \\ 0 & 0 & 1 \end{bmatrix}$$

and $W_K$ is a white noise sequence whose covariance is given by:

$$Q_k = \begin{bmatrix} \frac{\Delta t^5}{20} & \frac{\Delta t^4}{8} & \frac{\Delta t^3}{6} \\ \frac{\Delta t^4}{8} & \frac{\Delta t^3}{3} & \frac{\Delta t^2}{2} \\ \frac{\Delta t^3}{6} & \frac{\Delta t^2}{2} & \Delta t \end{bmatrix} \cdot q$$

where q is the process noise strength for the particular process (plant) under consideration. The conversion from continuous to discrete time is well known in the art.

For the Piper Arrow IV on which we have tested the system, we have found the process noise in the North and East direction, $q^{NE}$, to be approximately 0.001 $(m^2/sec^7)$ and the process noise $q^D$ in the down direction to be approximately 0.0005 $(m^2/sec^7)$. The measurement model was defined as:

$$Y_K = H_K X_K + V_K$$

where $Y_K$ is the measurement of the velocity in the North, East, Down directions provided by the GPS receiver at time $t_K$; $H_K$ is the measurement connection matrix $H_K = [1\ 0\ 0]$; and $V_K$ is the measurement noise, which is assumed to be a wide noise sequence with variance $R_K$.

Figure 8:
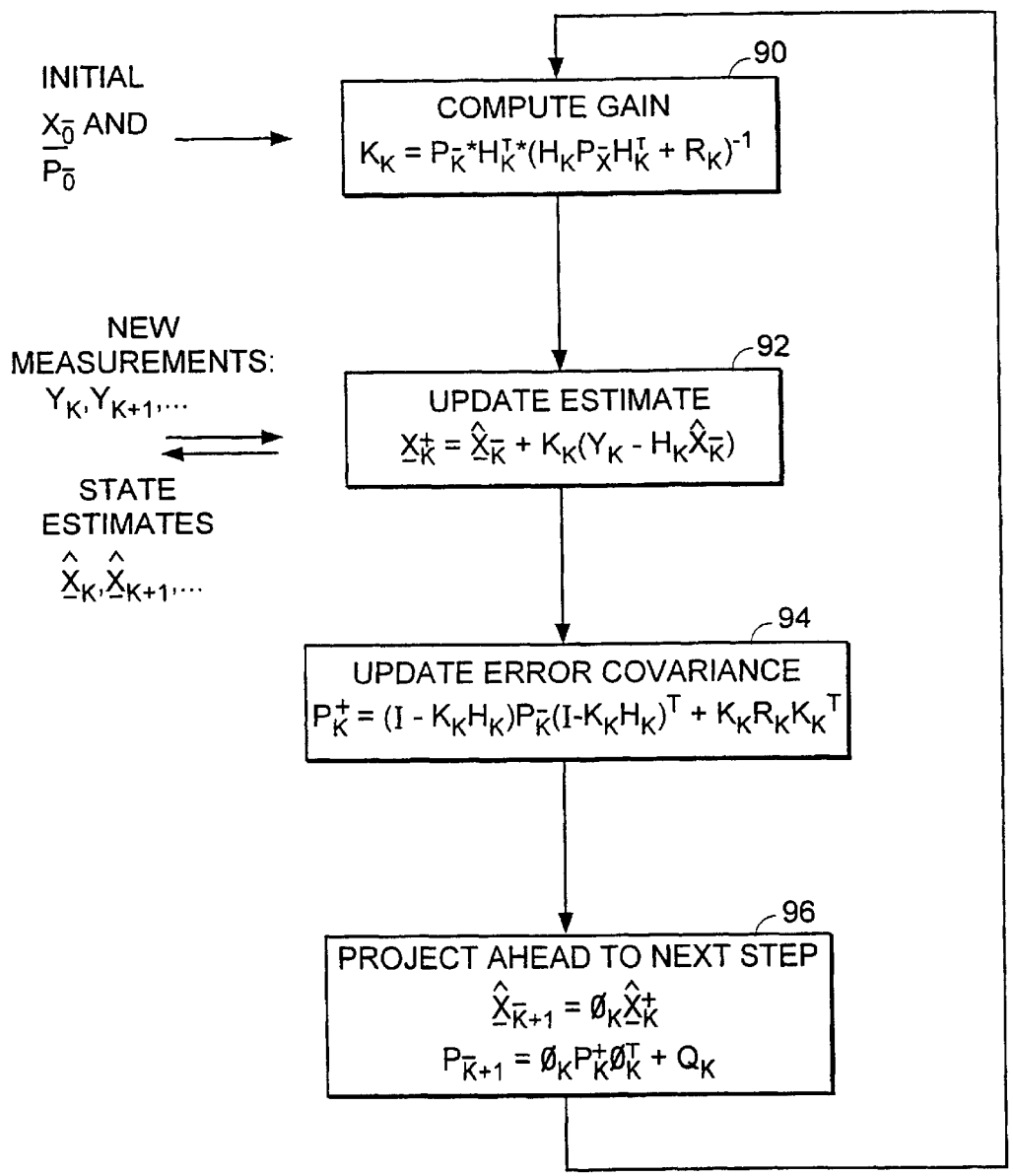
FIG. 8 is a flow diagram showing the determination of the state estimates (velocity and acceleration)

The determination of the state estimates $\hat{X}_K, \hat{X}_{K+1}$ is then made in accordance with FIG. 8, which is a flow diagram of the computations that have been implemented on a personal computer running the Windows operating system. In FIG. 8, a carot above a quantity indicates an estimate of the quantity; a minus a sign to the upper right of a quantity indicates the prior value of the quantity; a plus sign to upper right of the quantity indicates the updated value of the quantity; a "T" to the upper right indicates matrix transpose; and a "−1" to the upper right indicates matrix inversion.

As shown in FIG. 8, an updated value of the gains $K_K$ are computed at step 90, followed by the acquisition of new measurements $Y_K$ and the determination of new estimates $\hat{X}_K$ at step 92. The error covariance matrix $Q_K$ is then updated in step 94, and the estimate finally projected ahead to the next step in step 96. The required computations have been found sufficiently non-demanding as to allow updating of the display at a rate of approximately ten times per second, thereby enabling use of the attitude indicator as a real-time navigation instrument.

It will be appreciated that if the aircraft angle of attack ($\alpha$) is measured or estimated, then conventional pitch angle ($\theta$) and roll angle ($\phi$) (with respect to the body axes) are determined well in accordance with the present invention by a simple rotation about the $y_s$, $y_b$ axis by the measured or estimated angle of attack. Hence $\theta$ and $\phi$ can thus be readily displayed to the pilot. This transformation is well known in the art and will not be further described.

A significant aspect of the present invention is that it enables the provision of a simple, integrated flight information and control system for navigation and control of aircraft of all sizes, small as well as large. Integrated flight information and control systems are known, but heretofore their use has been confined to large, commercial aircraft or to military aircraft, because of the cost and complexity of such systems. In accordance with the present invention, however, the essential flight navigation and control data, i.e., position, altitude, vertical speed, ground speed, ground heading, and now, pseudo attitude, are obtained from a single GPS receiver, thus eliminating expensive and cumbersome sensors such attitude and heading reference systems (AHRS) which have heretofore put integrated flight information and control systems out of the reach of other than commercial and military aircraft.

Figure 9A:
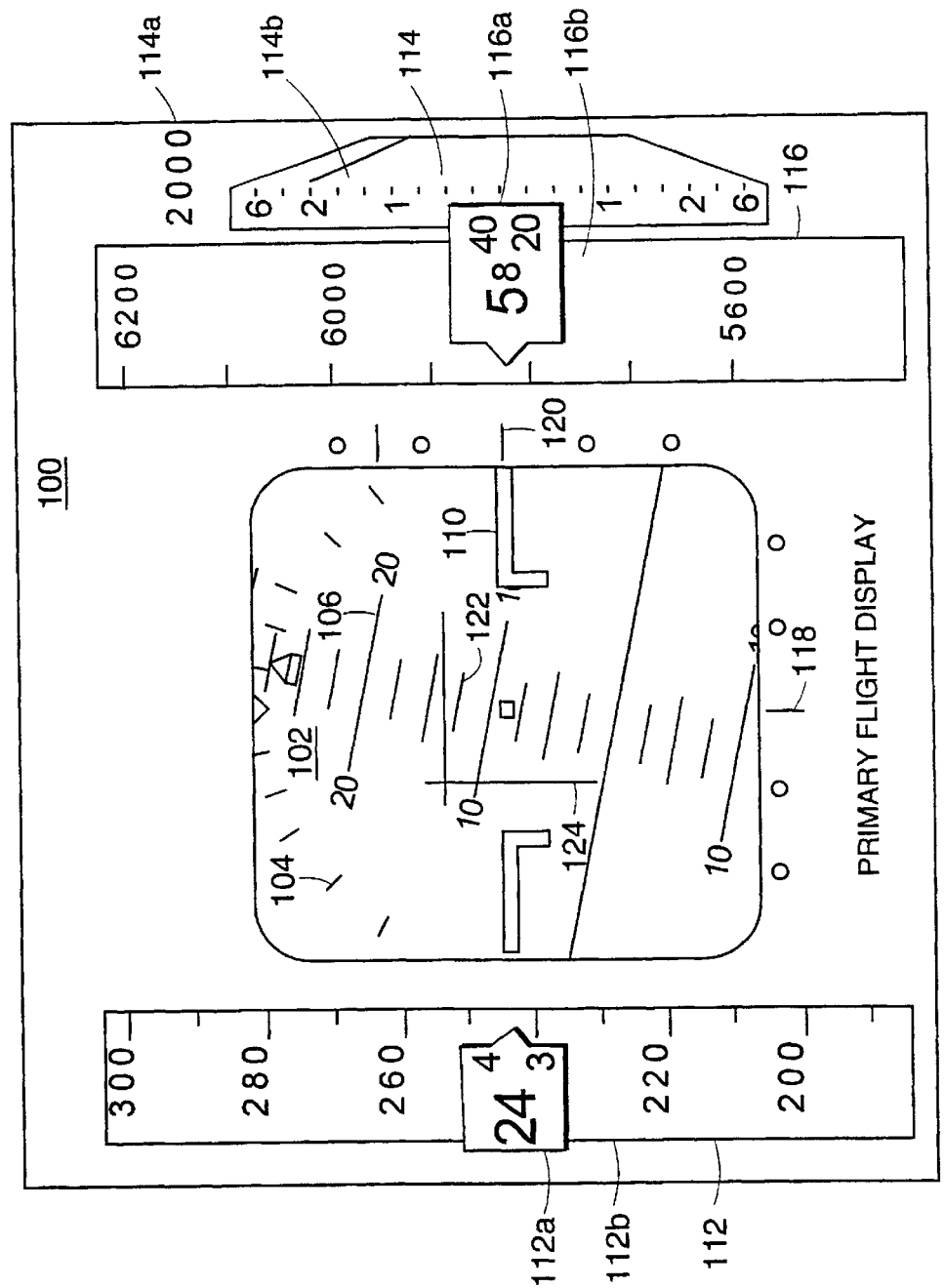
FIG. 9 is an illustration of a flight instrumentation system of a type commonly used in commercial aircraft but modified in accordance with the present invention, the system encompassing a primary flight display (FIG. 9A) and a navigation display (FIG. 9B).
Figure 9B:
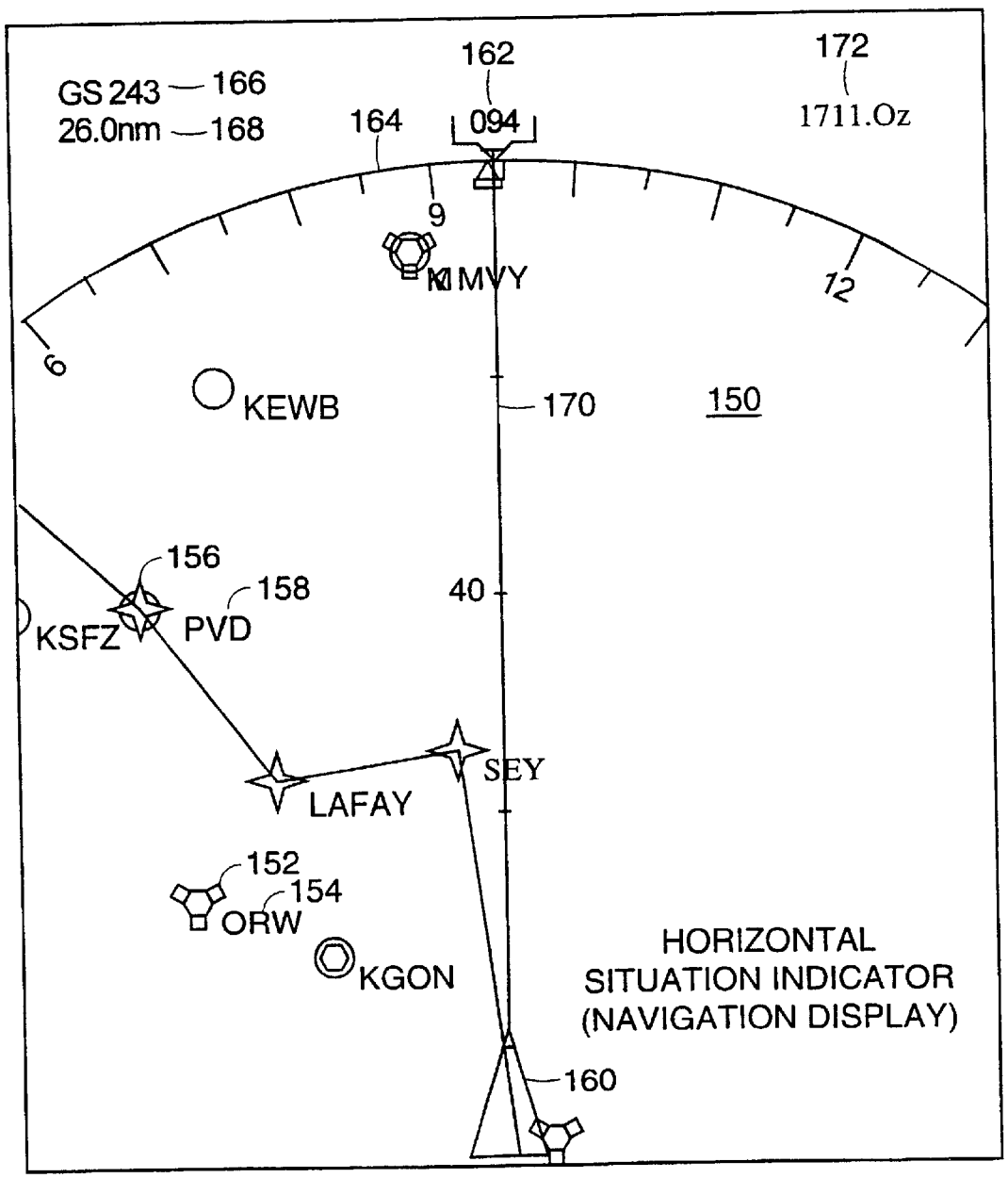

Thus, referring again to the drawings, FIG. 9A shows a primary flight display, and FIG. 9B a navigation display, of the type used to form the electronic flight instrument display of a Boeing 747–400 aircraft, but modified to present directly to the pilot the pseudo attitude (pseudo roll angle $\phi_s$) and flight path angle $\gamma$) as determined in accordance with the present invention, in place of the conventional body-axis attitude (roll angle $\phi$ and pitch angle $\theta$). The pseudo attitude presents a more direct measure of the actual path of the aircraft with respect to the earth than does the conventional body-axis attitude, and thus is more immediately useful in navigation and control of the aircraft.

Thus, in FIG. 9A, a primary flight display unit 100 includes an attitude indicator 102 on which are displayed angular roll indicia 104 indicative of the stability axis roll angle $\phi_s$ and linear indicia 106 indicative of the flight path angle $\gamma$, both as determined in accordance with the present invention. An aircraft indicator 110 provides a reference for determining the magnitude of these angles at any given moment. A ground speed indicator 112 provides a direct digital indication, 112a, and analog indication, 112b, of the ground speed as determined from the measured velocity V (Vx, Vy, Vz). The attitude and ground speed parameters are thus presented to the pilot in a familiar format, but provide data that is more immediately useful for control and navigation.

A vertical speed display element 114 shows the vertical speed in both digital, 114a, and analog, 114b, form. Similarly, an altitude display 116 shows the altitude in both digital, 116a, and analog, 116b, form. An azimuth deviation indicator 118 provides an indication of the horizontal deviation from the desired flight path, while an elevation deviation indicator 120 provides an indication of the vertical deviation from the desired flight path. Further in accordance with the present invention, a pitch command bar 122 and a roll command bar 124, which heretofore served as reference indicators for the desired (body-axis) roll $\phi$ and pitch $\theta$ now provide the desired reference for the pseudo roll angle $\phi_s$ and the flight path angle $\gamma$, which are used to maintain the aircraft on a desired flight path, and thus form pseudo-attitude command bars. The display of these bars is controlled by a flight computer in accordance with the measured position of the aircraft, the aircraft dynamics, and the desired flight path as established by the pilot.

Supplementing the primary flight display 100 (FIG. 9A) is a navigation display 150 (FIG. 9B). The display comprises an underlying map containing navigation symbols 152 and identifiers 154 of the area that the aircraft is traversing at a given time. These symbols and identifiers are retrieved by a flight computer from a database in accordance with the current position of the aircraft and presented on the display 150. Typically, they form a standardized set for the area being traversed. The display similarly includes waypoint symbols 156 and identifiers 158 also retrieved from the database by the flight computer. The waypoint symbols and identifiers are selected by the pilot in connection with planning the flight.

An aircraft indicator 160 indicates the current position of the aircraft. In accordance with the present invention, a digital, 162, and analog, 164, ground track direction display indicates the current ground track direction of the aircraft. The data for the display is derived from the single GPS sensor measurements described above. A digital ground speed indicator 166 indicates the current speed relative to the ground. Completing the display 150 is a digital display 168 and an analog display 170 indicating the distance to the next waypoint, and a time display 172. With respect to physical implementation, the displays 100 and 150 are advantageously formed as video displays on a CRT (cathode ray tube), an LCD (liquid crystal device), or the like.

In accordance with the present invention, all the data for the above displays is derived from a single GPS receiver. In particular, the pseudo-attitude is obtained as described in detail above. The vertical speed, ground speed and ground track direction are obtained directly from the velocity vector V (Vx, Vy, Vz) that is determined as described above. The altitude and position of the aircraft and the current time are determined from the GPS sensor in the conventional manner. Thus, additional, frequently elaborate and expensive sensors such as gyros are completely eliminated and the attitude and other information previously provided by them is now obtained in a reliable manner from the GPS system instead. As a result, the cost, complexity, and weight of the navigation and control system is greatly reduced, and it is now possible for the first time to include a fully integrated flight information and control system in even small, non-commercial, non-military aircraft.

Although it is contemplated that the system of the present invention will find most widespread use in piloted aircraft navigation and control in which the flight information display will be used to provide the necessary information to a pilot for navigation and control in accordance with the information displayed, it should be understood that it is not so restricted. Specifically, the data generated by the system as described herein may be used to navigate and control the aircraft in autopilot mode; in that case, the flight display is used simply to monitor the autopilot control. Further, the system may be incorporated into pilotless vehicles to control their flight from one point to another without human intervention.

From the foregoing, it will be seen that the system of the present invention has wide application in aircraft navigation, from the smallest of private aircraft to large commercial craft. The system is not restricted to fixed wing aircraft, but is expected to also find application in the navigation of helicopters, where the determination of flight path can otherwise be quite complicated. Thus, the term "aircraft" as used herein should be understood in its broadest sense as applicable to any vehicle moving in three dimensional space. Other applications and modifications will readily suggest themselves to those skilled in the art, and it is intended that the foregoing be taken as illustrative only, the scope of the invention being defined with particularity in the claims appended hereto.

What is claimed is:

1. A navigation system for mounting on a vehicle for determining the stability axis flight path angle $\gamma$ and stability axis roll angle $\phi_s$ of said vehicle while undergoing arbitrary but balanced maneuvers along a flight path through space with respect to a reference frame, said system comprising:

A. a navigation processor including:
    (1) measuring means for measuring at least one of the position or velocity of said vehicle as it moves along said path;
    (2) means responsive to said measurements for extracting estimates of the velocity and acceleration of said vehicle at successive positions along said path; and
    (3) processing means for calculating the flight path angle $\gamma$ and stability axis roll angle $\phi_s$ corresponding to said estimates; and B. a navigation display for displaying said angles for navigating said vehicle in accordance therewith.

2. A navigation system according to claim 1 in which said estimate extracting means includes a filter:

A. having at least three integrators for forming estimates of jerk, acceleration, and velocity;
  B. receiving as inputs said position measurements; and
  C. providing as outputs at least said velocity and acceleration estimates for said processing means.

3. A navigation system according to claim 2 in which said filter is characterized by a response time sufficiently short as to enable real-time navigation of said vehicle in accordance with said display.

4. A navigation system according to claim 3 in which said response time is of the order of less than one second.

5. A navigation system according to claim 2 in which said filter receives as further input a process noise variance characteristic of the vehicle in which said navigation system is mounted.

6. A navigation system according to claim 5 provided in a single unit transportable from vehicle to vehicle.

7. A navigation system according to claim 1 in which said filter comprises a plurality of separate and independent filters, each providing a component of the vehicle velocity as output therefrom for calculation of said flight path angle $\gamma$ in accordance therewith.

8. A navigation system according to claim 1 in which said position measuring means comprises a single satellite positioning system receiver providing measurements of the position of said vehicle with respect to an earth-based reference system.

9. A navigation system according to claim 8 in which said processing means determines from said velocity and acceleration estimates a local horizontal reference relative to said reference frame and associated with said estimates and thereafter determines said stability roll angle $\phi_s$ therefrom.

10. A navigation system according to claim 1 in which the flight path angle $\gamma$ and stability axis roll angle $\phi_s$ provide the primary attitude information from which the vehicle is maneuvered.

11. A navigation system according to claim 1 in which the flight path angle $\gamma$ and stability axis roll angle Us provide supplemental attitude information in connection with maneuver of the vehicle.

12. A navigation system according to claim 1 in which said estimate extracting means including a Kalman filter having multiple integrators for providing said velocity and acceleration estimates and characterized by a response time sufficiently short as to enable real-time control of the attitude of said vehicle in accordance with said display.

13. A navigation system according to claim 12 in which said processing means determines from said velocity and acceleration estimates a local horizontal reference relative to said reference frame and associated with said estimates and thereafter determines said stability roll angle $\phi_s$ therefrom.

14. A navigation system for determining the stability axis flight path angle $\gamma$ of a vehicle undergoing arbitrary but balanced maneuvers along a flight path through space with respect to a reference frame, comprising:

A. means for measuring at least the position or velocity of the vehicle with respect to said frame as it undergoes said maneuvers;
  B. means responsive to said position measurements for determining the velocity of said vehicle along said path;
  C. means for calculating said flight path angle from said velocity.

15. A navigation system according to claim 14 in which said velocity determining means includes a satellite positioning receiver aboard said vehicle and providing as output measurements of the position of said vehicle with respect to said reference frame.

16. A navigation system according to claim 15 in which said estimate extracting means comprises a Kalman filter adapted to receive said position measurements as input and to provide estimates of said vehicle velocity as output.

17. A navigation system according to claim 16 in which said filter comprises a plurality of separate and independent filters, each providing a component of the vehicle velocity as output therefrom.

18. A navigation system according to claim 17 in which said filter comprises a triple integrator filter forming estimates of the jerk, velocity, and acceleration of said vehicle as it moves along said flight path.

19. A navigation system according to claim 18 in which said calculating means further includes means responsive to velocity and acceleration outputs of said filter for determining the stability axis roll angle $\phi_s$ therefrom.

20. A navigation system according to claim 19 having a time constant on the order of one second or less whereby said vehicle may be navigated in accordance with the flight path angle and stability axis roll angle calculated by said navigation system.

21. Apparatus for determining the conventional attitude of an aircraft undergoing arbitrary flight path maneuvers, comprising:

A. means providing measurement of the stability axis flight path velocity and acceleration of the aircraft in a first, locally stationary frame;
  B. means for determining the stability axis flight path angle of the aircraft in a second, stability frame, from orthogonal velocity components measured in said first frame;
  C. means for determining the roll of the aircraft in said second frame in an arbitrary but balanced banking maneuver from the aircraft velocity measured in said first frame, the lift in said second frame as determined from the normal flight path acceleration component in said second frame, and the gravitational acceleration component in said second frame normal to the flight path;

D. means for determining the angle-of-attack of said aircraft; and

E. means for transforming the pitch and roll in said second frame to a third, body-axis frame in accordance with said angle of attack.

22. A method of navigating a vehicle through space along an arbitrary flight path while undergoing arbitrary but balanced maneuvers with respect to a reference frame, comprising:

A. repeatedly measuring at least one of position or velocity of the vehicle as it undergoes said maneuvers;

B. forming estimates of the velocity and acceleration of said vehicle at said positions from said measurements;

C. determining the stability axis flight path angle $\gamma$ from said velocity estimates;

D. determining from said velocity and acceleration estimates a local horizontal reference corresponding thereto;

E. determining the stability axis roll angle Us with respect to said local horizontal reference;

F. navigating said vehicle in accordance with the calculated flight path angle $\gamma$ and stability axis roll angle $\phi_s$.

23. The method of claim 22 which includes the step of measuring said positions by means of a satellite positioning system providing position measurements with respect to said reference frame.

24. The method of claim 23 which includes the step of determining said local horizontal reference based on calculations of the normal component of the vehicle acceleration along said path as determined from said acceleration estimates.

25. The method of claim 24 which includes the step of determining said velocity and acceleration estimates by means of a Kalman filter having multiple integrators for providing said estimates.

26. The method of claim 25 in which said filter is characterized by a response time sufficiently short as to enable a real-time control of the attitude of said vehicle in accordance with said fight path angle $\gamma$ and said stability axis roll angle $\phi_s$.

27. The method of claim 26 in which said filter comprises a triple integrator filter forming estimates of the jerk, velocity, and acceleration of said vehicle as it moves along said flight path.

28. The method of claim 26 in which the flight path angle $\gamma$ and stability axis roll angle $\phi_s$ comprises the primary attitude display for navigation of said vehicle.

29. The method of claim 26 in which includes the step of displaying the flight path angle $\gamma$ and stability axis roll angle $\phi_s$ for navigation in accordance therewith.

30. An integrated flight information and control system for navigation and control of a vehicle, comprising:

A. means in said vehicle for determining the position and velocity of said vehicle; and B. means responsive to outputs from said determining means for determining navigation and control parameters for said vehicle, said parameters including at least the stability axis pseudo-attitude of said vehicle.

31. An integrated flight information and control system according to claim 30 in which said means for determining position and velocity comprises a single GPS system.

32. An integrated flight information and control system according to claim 30 which further includes information display means for displaying said parameters for navigation and control in accordance therewith.

33. An integrated flight information and control system according to claim 32 in which said display means includes at least a primary flight display and in which said parameters displayed in said display include at least the ground speed and ground track heading of said vehicle in addition to said pseudo-attitude.

34. An integrated flight information and control system according to claim 33 in which said parameters additionally include the position, altitude, and vertical speed of said vehicle.

35. An integrated flight information and control system according to either claims 30 or 34 which further includes means responsive to said parameters for controlling the flight of said vehicle along a flight path in accordance with said parameters.

36. An integrated flight information and control system according to either claims 30 or 35 in which said parameters are determined from data supplied by a single GPS receiver in said vehicle.

37. An integrated flight information and control system according to claim 30 which further includes means responsive to said parameters for controlling the flight of said vehicle along a flight path in accordance with said parameters.

38. An integrated flight information and control system according to claim 31 in which said display means includes pseudo-attitude command bars providing a reference for navigation and control of said aircraft along a defined flight path.

39. An integrated flight information and control system according to claim 30 in which the means responsive to outputs from said determining means includes a filter having at least three integrators for forming estimates of jerk, acceleration, and velocity based on measurements of velocity or position and providing as outputs estimates of velocity and acceleration for determination of pseudo-attitude therefrom.

40. An integrated flight information and control system according to claim 39 in which said filter comprises a plurality of separate and independent filters, each providing a component of the vehicle velocity as output therefrom for calculation of said pseudo-attitude in accordance therewith.

* * * * *